Jan. 1, 1946. A. D. ANDREEF 2,392,079
APPARATUS FOR USE IN THE MANUFACTURE OF LAMINATED SKIS
Filed Feb. 15, 1944 2 Sheets-Sheet 1
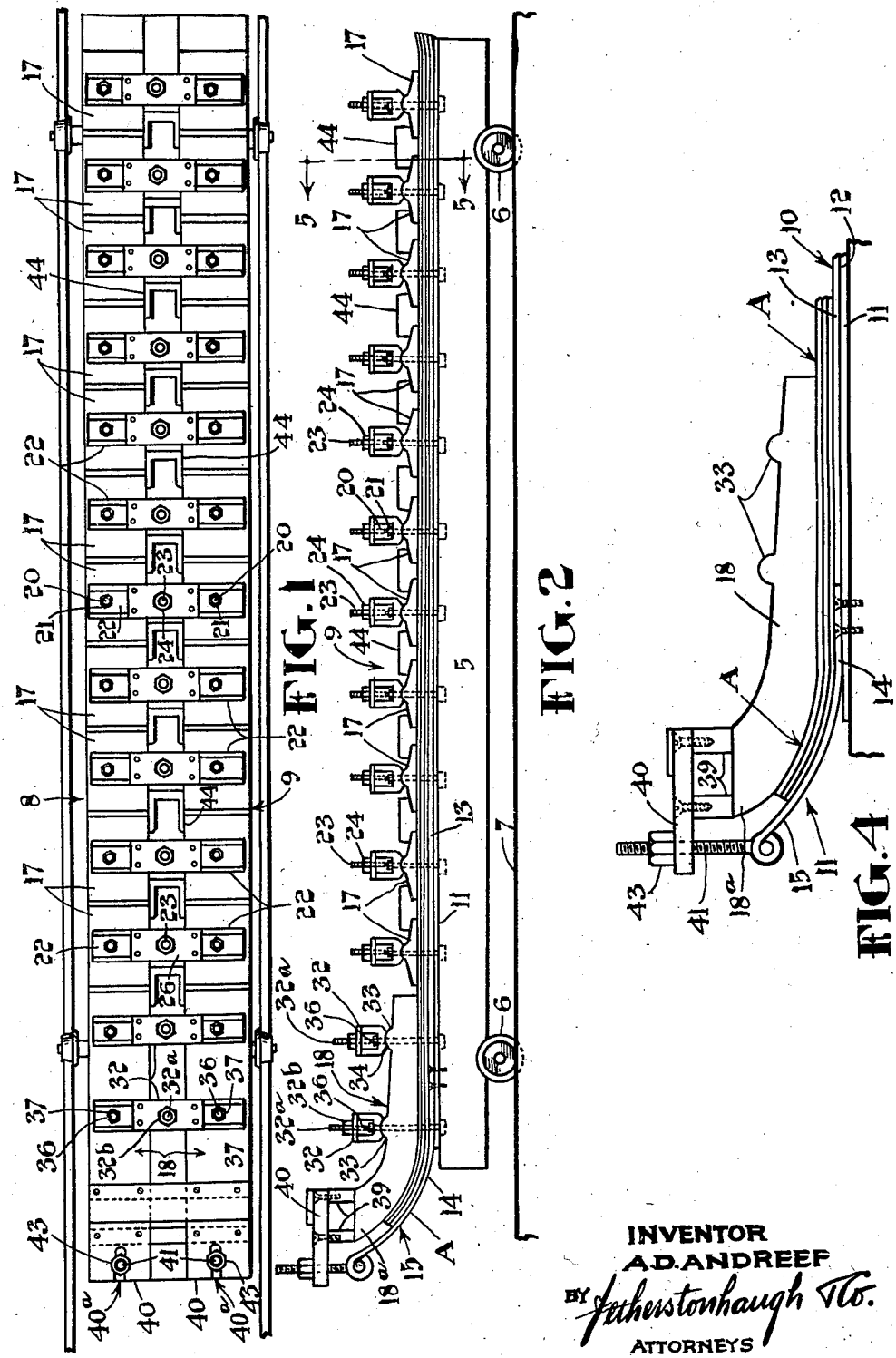
INVENTOR
A.D. ANDREEF
BY Fetherstonhaugh &Co.
ATTORNEYS Jan. 1, 1946.   A. D. ANDREEF   2,392,079
APPARATUS FOR USE IN THE MANUFACTURE OF LAMINATED SKIS
Filed Feb. 15, 1944   2 Sheets-Sheet 2
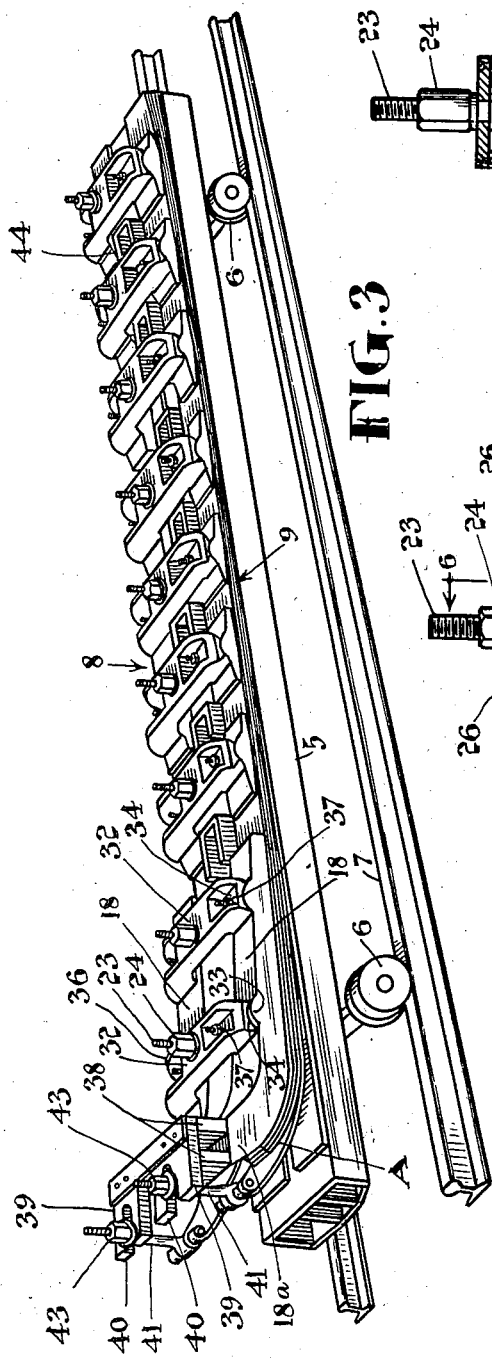
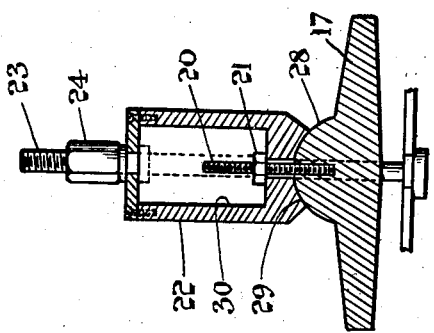
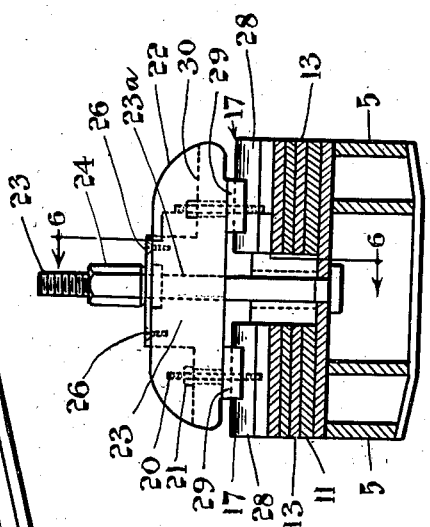
INVENTOR
A. D. ANDREEF
BY Fetherstonhaugh & Co.
ATTORNEYS Patented Jan. 1, 1946

2,392,079

UNITED STATES PATENT OFFICE 2,392,079

APPARATUS FOR USE IN THE MANUFACTURE OF LAMINATED SKIS

Alexis D. Andreef, Montreal, Quebec, Canada

Application February 15, 1944, Serial No. 522,513
In Canada February 19, 1943

3 Claims. (Cl. 144—265)

This invention relates to apparatus for use in the manufacture of laminated skis and, particularly, to pressing apparatus whereby previously assembled, adherent component layers of a laminated ski are bonded together and given the requisite longitudinal curvature by a pressing or molding operation.

I have found that, in many cases, the breakage and warpage of laminated skis which is attributed to faulty materials or design are, in fact, due to improper application of the molding pressure by which the component layers of the ski are united and given the requisite longitudinal curvature during the process of manufacture. The press ordinarily employed for uniting and shaping component layers of a laminated ski comprises upper and lower pressing members, each of which is made in one continuous piece. In some cases the pressing members are rigid members which have their pressing surfaces appropriately curved according to the longitudinal curvature or camber desired in the finished ski. In other cases the press comprises a rigid member and a flexible member, the assembled layers of the laminated ski being pressed against a longitudinally curved pressing surface of the rigid member by the flexible member which is sufficiently flexible to bend the interposed ski layers to the curved shape prescribed by the curved surface of the rigid member.

Owing to the variation in thickness at various points along the length of the ski formed by the assembled layers the foregoing and other types of presses previously used for applying the requisite consolidating and shaping pressure do not effect a proper distribution of the applied pressure since the pressure applied to the thicker portions of the ski is usually greater than the pressure applied to the thinner portions. The present invention overcomes this difficulty by providing an improved type of press in which one of the pressing members comprises a rigid body-shaping part and a flexible toe-shaping part and in which the cooperating pressing member is composed of a plurality of independently movable body-shaping sections, one of which is provided with an appropriately curved rigid toe-shaping part adapted to cooperate with the previously mentioned flexible toe-shaping part. In this case the body portion of the ski formed by the assembled layers is shaped between the rigid body-shaping part of the first mentioned pressing member and the independently movable body-shaping sections of the second mentioned pressing member, said independently movable body-shaping sections being sequentially operated into pressing engagement with the ski layers so that the latter are subjected to a desirable ironing action in that the pressure is applied progressively from the center toward each end of the ski. The upward curvature desired at the toe end of the ski is obtained by drawing the flexible toe-shaping part of the first mentioned pressing member toward the curved rigid toe-shaping part of the second mentioned pressing member after the shaping pressure has been progressively applied to the body portion of the ski. As previously described this ensures that, regardless of the variation in thickness at different points along the length of the ski, the requisite pressure will be applied at each point to ensure a proper bending and shaping of the ski layers which greatly minimizes warpage and breakage of the ski in service.

Proceeding now to a more detailed description of the invention reference will be had to the accompanying drawings, wherein—

Fig. 1 is a plan view of a duplex press whereby the component layers of two laminated skis may be pressed and shaped in one operation in accordance with the principles of my invention.

Fig. 2 is a side elevation of the press assembly shown in Fig. 1.

Fig. 3 is an enlarged view of the cooperating toe-shaping parts of the upper and lower pressing elements of one of the presses shown in the preceding figures.

Fig. 4 is a perspective view of the complete press shown in Figs. 1 and 2.

Fig. 5 is an enlarged sectional view taken substanially along the section line 5—5 of Fig. 2.

Fig. 6 is an enlarged sectional view taken along the line 6—6 of Fig. 5.

In the present drawings I have shown two presses mounted on a truck 5 equipped with supporting wheels 6 arranged to run on track rails 7. The presses are generally indicated at 8 and 9 and are of duplicate construction.

The lower element of each press is a substantially unitary structure comprising a fixed body-shaping part 10 and a flexible toe-shaping part 11. The body-shaping part 10 comprises a molding member 11 provided with a longitudinally curved upper surface 12 which is covered by facing plates 13 and 14 arranged in end to end relation thereon. A portion of the facing plate 14 projects beyond the toe end of the body-shaping mold member 11 and provides a flexible toe-shaping part 15. The upper surface 12 of mold member 11 and the overlying portions of the facing plates 13 and 14 are curved in accordance with the longitudinal curvature or camber which it is desired to impart to the laminated ski during the pressing operation. The mold member 11 may be made of lead or other suitable metal but the facing plates 12 and 13 should be made of steel or other hard metal capable of being polished or otherwise finished to give a smooth pressing surface.

The upper element of each press comprises a plurality of independently movable pressure applying sections including a plurality of body-shaping sections 17 and a combined body and toe-shaping section 18, the sections 17 and 18 of each press being paired with corresponding oppositely located sections of the companion press. In this connection it will be noted that the body-shaping sections 17 of each pair are suspended by stud bolts 20 and clamping nuts 21 from opposite ends of a pressure applying bar 22 which extends transversely across the upper surface of the truck 5. The central portion of said pressure bar is provided with a vertical opening 23a (Fig. 5) for the passage of a threaded post 23 extending upwardly from the truck 5 and is also provided with a swivel nut 24 in threaded engagement with said post whereby said pressure bar may be raised and lowered to effect corresponding movement of the attached body-shaping sections 17. In this connection it will be noted that the lower end of nut 24 is fitted in a recess formed by enlarging the upper end of the post receiving opening 23a and is provided with a circular groove receiving therein the inner ends of a pair of retaining plates 26 fastened to the upper surface of the bar 22.

The stud 20 of each pressure applying section 17 projects upwardly from a spherically curved projection 28 which is held to a spherically curved seat 29 of the bar 22 by means of the clamping nut 21, the latter being screwed home against the upper surface of the bottom wall of a recess 30 provided at the end of bar 22.

The oppositely arranged body and toe-shaping sections 18 of the two presses are suspended from opposite ends of two vertically movable pressure applying bars 32 which correspond to the previously mentioned pressure applying bars 22. In this connection it will be noted that each section 18 is provided with two spherically curved projections 33 which are held to spherically curved seats 34 of the bars 32 by threaded studs 36 and clamping nuts 37 corresponding to the previously described threaded studs 20 and clamping nuts 21. Threaded posts 32a extend upwardly through central openings of the bars 32 in threaded engagement with clamping nuts 32b carried by said bars.

The body and toe-shaping sections 18 are formed with upwardly curved toe ends 18a which are joined together by transversely extending connecting members 39 of which are mounted a pair of plates 40 provided with slots 40a which are open at their front ends to receive therein swivel bolts 41 having their lower ends pivotally secured to the free ends of the previously mentioned flexible toe-shaping parts 15 of the lower press element. The swivel bolts 41 carry clamping nuts 43 which, when the swivel bolts are swung into the slots 40a, are tightened against the upper surfaces of the plates 40 to draw the flexible body-shaping parts 15 of the lower press elements toward the curved ends 18a of the upper body and toe-shaping sections 18. A plurality of channel-shaped post members 44 are shown extending upwardly from the truck 5 between the opposing upper and lower pressing elements of the two presses. These channel-shaped posts 44 serve to prevent lateral swinging movement of the pressing elements 17 and 18. They also serve as abutments against which the inner sides of two laminated skis are butted when the skis are inserted between the upper and lower pressing elements of the presses.

In using the press described herein a partly formed laminated ski A, here shown as consisting of three superposed layers or laminations, is inserted between upper and lower pressing elements of each press with the inner side of the skis butted against the adjacent sides of the channel-shaped posts 44. The sections 17 and 18 of the upper press sections are then forced downwardly, by manipulation of the nuts 24 and 32b, into pressing engagement with the underlying skis.

The swivel bolts 41 are then swung into the slots 40 and the clamping nuts 43 tightened to draw the flexible toe-shaping parts 15 of the lower pressing elements toward the curved toe ends 18a of the upper body and toe-shaping sections 18 whereby the toe ends of the ski are given the desired upward curvature. When these operations are completed the truck 5 is moved along the track rail 7 into an oven or steaming chamber (not shown) where the component laminations of the skis are steamed in the usual manner to cause them to retain their curved shape and to be firmly united by the setting and hardening of the glue interposed therebetween.

In using the press described herein it is preferred that the clamping and molding pressure be first applied to the central portion of each ski by moving the central body-shaping sections 17 downwardly into pressure applying engagement therewith and that the remaining pressure applying sections 17 and 18 be tightened so that the pressure is gradually applied to the skis from the central to the end portions thereof, the final pressure being applied by downward movement of the pressure applying sections 17 at the heel end of the ski and by upward movement of the flexible pressure applying part 15 located at the toe end of the ski. This method of applying the pressure gives a desirable ironing action in that the pressure is applied progressively from the centre toward each end of the ski.

Having thus described my invention, what I claim is:

1. Apparatus for uniting and shaping, in one operation, previously assembled adherent layers of two laminated skis, said apparatus comprising a base, a pair of lower pressing members arranged on said base in side by side relation, each member comprising a fixed body-shaping part having its upper surface longitudinally curved and a flexible toe-shaping part, a pair of upper pressing members, each overlying and arranged to cooperate with one of the lower pressing members and comprising a plurality of independently movable sections, one of which is provided with an appropriately curved rigid toe-shaping part overlying the flexible toe-shaping part of the cooperating lower member, a plurality of vertically movable pressure applying bars extending transversely across said base, one end of each bar carrying one section of one of the upper pressing members and the opposite end of said bar carrying an oppositely arranged section of the other upper pressing member, means for raising and lowering said bars and means for drawing the flexible toe-shaping part of each lower pressing member toward the overlying rigid toe-shaping part of the cooperating upper pressing member.

2. Apparatus as set forth in claim 1, in which the two bottom pressing members are arranged in laterally spaced relation and in which a plurality of abutment members extend upwardly between said pressing members to provide abutments for the inner edges of the ski layers arranged on said pressing members during the pressing operation.

3. Apparatus for uniting and shaping, in one operation, previously assembled adherent layers of a laminated ski, said apparatus comprising a base, a lower pressing member arranged on said base comprising a fixed body-shaping part and a flexible toe-shaping part, the upper surface of said body-shaping part being longitudinally curved in accordance with the longitudinal curvature or camber desired in the body portion of the ski, upper pressing elements comprising a plurality of vertically movable shoe sections adapted to be independently moved into and out of pressing engagement with assembled ski layers previously arranged on said lower pressing member, one of said shoe sections including an appropriately curved rigid toe-shaping part against which the flexible toe-shaping part is drawn to impart a predetermined upward curvature to the interposed toe ends of the ski during the pressing operation and means for raising and lowering each of said shoe sections comprising a threaded post extending upwardly from said base, a pressure applying member through which said post extends, a swivelled pressure applying nut carried by said pressure applying member in screw threaded engagement with said post and means interconnecting the pressure applying member with its associated shoe section so as to permit of rocking movement of the shoe section relative to said pressure applying member.

ALEXIS D. ANDREEF.